Dec. 10, 1946.        G. J. LAUER        2,412,343
LAWN MOWER RE-EDGER
Filed April 21, 1944            2 Sheets-Sheet 1
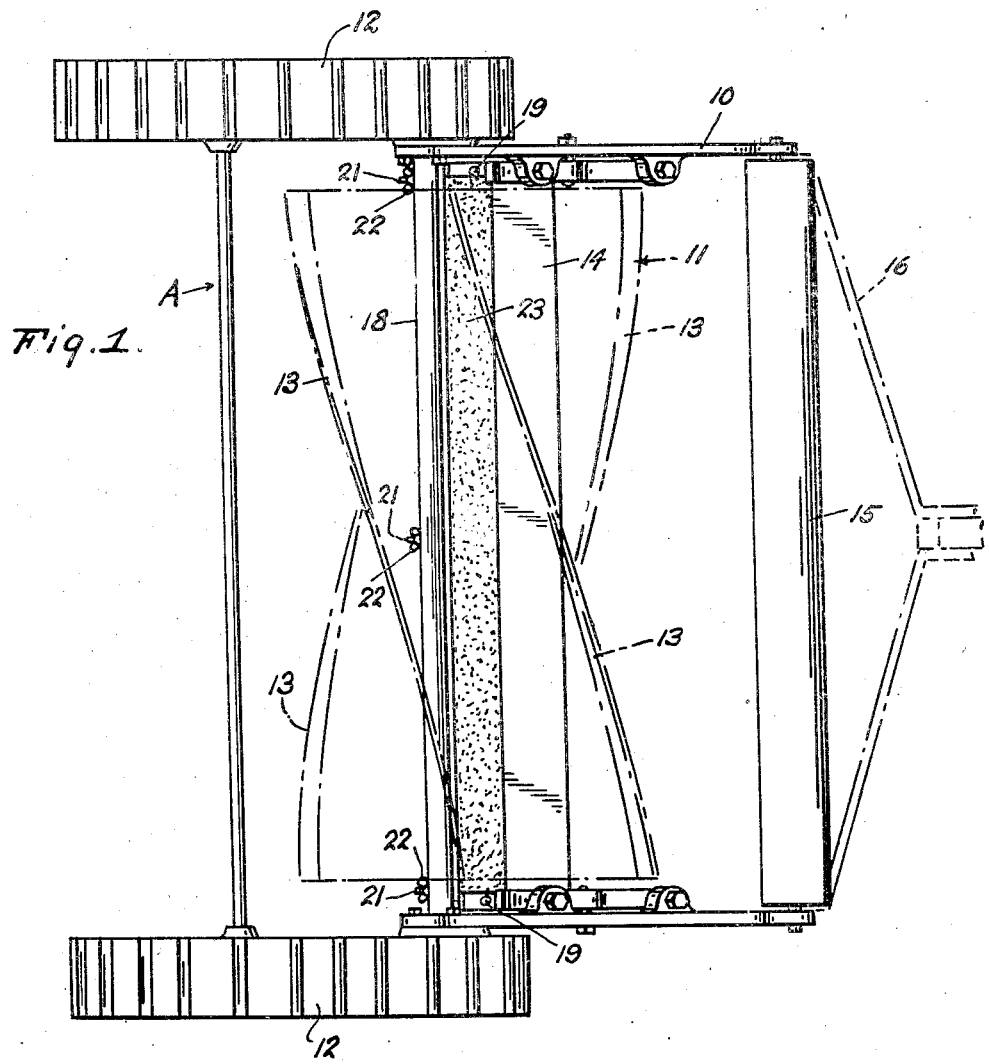
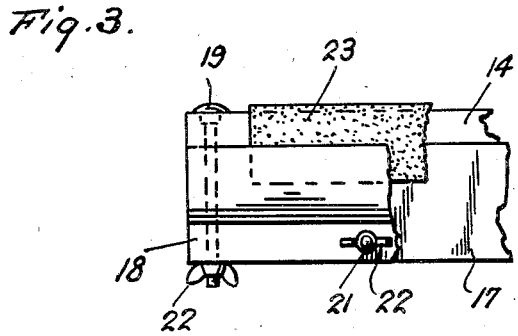
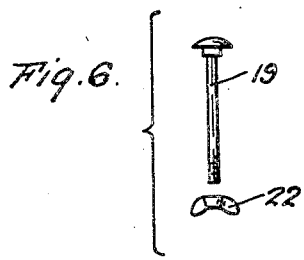
INVENTOR.
George J. Lauer
BY
Victor J. Evans & Co.
ATTORNEYS Dec. 10, 1946.     G. J. LAUER     2,412,343
LAWN MOWER RE-EDGER
Filed April 21, 1944     2 Sheets-Sheet 2
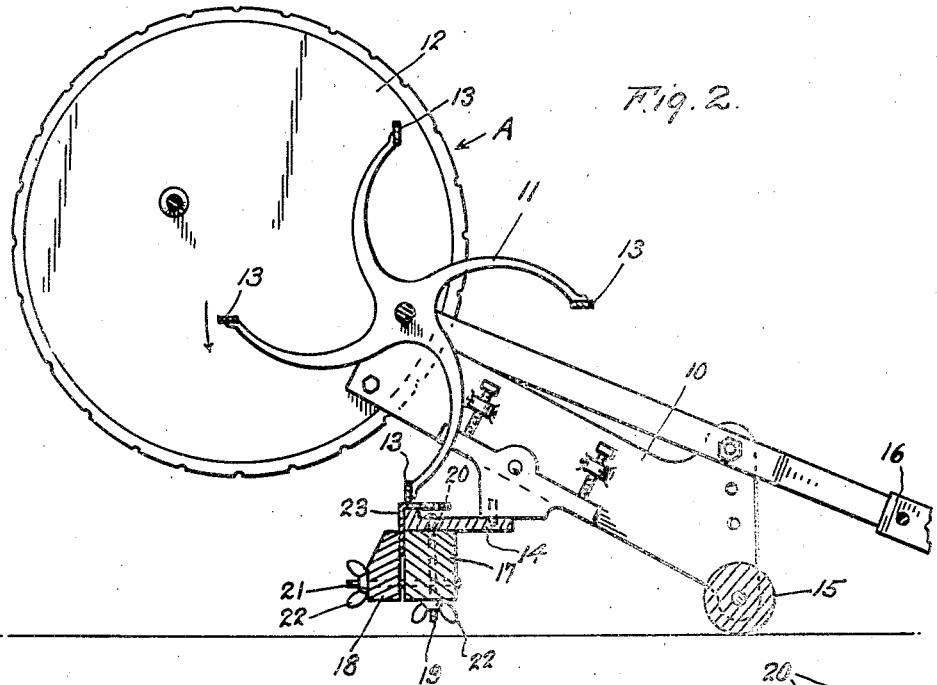
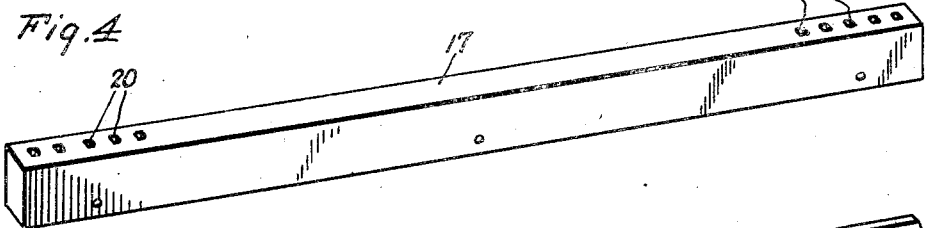
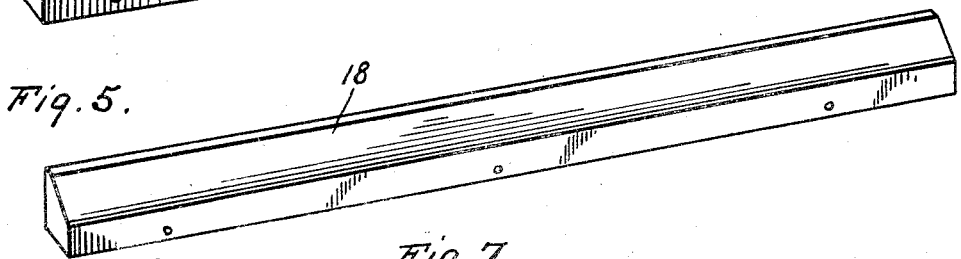
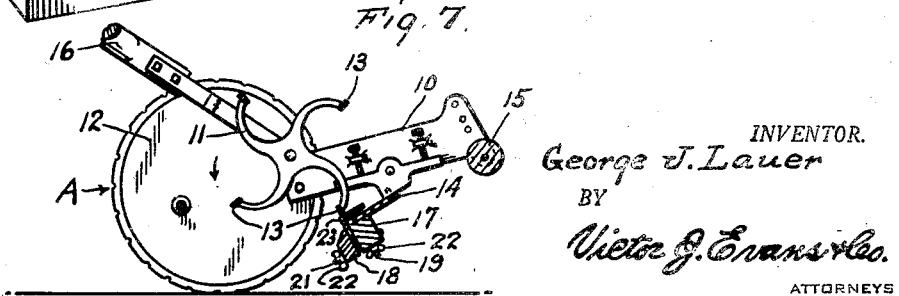
INVENTOR.
George J. Lauer
BY
Victor J. Evans & Co.
ATTORNEYS Patented Dec. 10, 1946

2,412,343

UNITED STATES PATENT OFFICE 2,412,343

LAWN MOWER RE-EDGER

George J. Lauer, Long Beach, Calif.

Application April 21, 1944, Serial No. 532,074

3 Claims. (Cl. 51—250)

The invention relates to a re-edger for the cutting blades of a lawn mower, and more especially to an automatic sharpener device for lawn mowers.

The primary object of the invention is the provision of a device of this character, wherein the cutting blades of a lawn mower can be readily and conveniently sharpened when the said mower is bodily moved and has its wheels contacting a foundation or the ground or while the said wheels are out of contact with such foundation or ground and turned by hand, to have the stationary blade and the rotary blades match one another under the sharpening operation, in either instance.

Another object of the invention is the provision of a device of this character, wherein should the lower stationary blade be out of contour, the flexibility of such device will permit the rotary cutting blades to effectively grind for meeting and conforming with the cutting edge of the said lower stationary blade of the mower, the said device being novel and unique.

A further object of the invention is the provision of a device of this character, wherein the grinding or sharpening medium thereof is susceptible of adjustment and such device can be attached and removed with dispatch to and from the mower.

A still further object of the invention is the provision of a device of this character, which is simple in construction, thoroughly reliable and efficient in operation, readily and easily applied and removed, strong, durable, eliminating hand sharpening of the blades of a lawn mower, avoids the use of steel files for sharpening purposes, as there is employed emery cloth or other like abrasive sheets of material in the sharpening operation with a flexible sweeping action retained thereby, and inexpensive to manufacture and install.

With these and other objects in view, the invention consists in the features of construction, combination and arrangement of parts as will be hereinafter more fully described, illustrated in the accompanying drawings, which show the preferred embodiment of the invention, and pointed out in the claims hereunto appended.

In the accompanying drawings:

Figure 1 is a fragmentary top plan view of a lawn mower of standard construction showing the device constructed in accordance with the invention applied for sharpening purposes.

Figure 2 is a vertical transverse sectional view of the mower and device with the said mower in an adjusted position for sharpening purposes.

Figure 3 is a fragmentary front view of the device.

Figure 4 is a perspective view of one of the clamping bars of the device detached.

Figure 5 is a similar view of the other clamping bar of the device.

Figure 6 is an exploded view in elevation of one of the hanger bolts used with the device.

Figure 7 is a view similar to Figure 2 showing another adjusted position of the mower for sharpening purposes.

Similar reference characters indicate corresponding parts throughout the several views in the drawings.

Referring to the drawings, A designates generally a portion of a lawn mower of any standard construction, it being the hand manipulated type, and is shown merely to illustrate the application thereto and the operation of the sharpening device constituting the present invention and hereinafter set forth in detail. The mower A as usual has supported in its carriage 10 a bladed rotary cutter 11, which is driven by the ground wheels 12 in the ordinary well known manner, and the blades 13 of this rotary cutter 11 cooperate with a stationary lower cutter blade 14 fitted to the carriage, while the latter is equipped with a trailer roller 15 arranged rearmost to said blade 14, as is common. Associated with the carriage 10 is a handle bar 16, for hand manipulation of the mower in the cutting operation thereof.

The sharpening device constituting the present invention, comprises a pair of clamping bars 17 and 18, respectively, the former serving as a hanger piece and is mounted underslung to the blade 14 by hanger bolts 19, each being selectively engageable in spaced clearances 20 therefor as provided in said bar 17 for the proper detachable fitting of the same to the under side of the blade 14, as is clearly shown in Figures 1, 2 and 3, of the drawings.

The upper forward edge of the bar 17 is arranged so as to be flush with the front edge of the blade 14, which is the cutting edge thereof, and the bar 18 is attached to the bar 17 by adjustable clamping bolts 21, these being in clearances therefor disposed crosswise of the bars 17 and 18, intermediate and near the outer ends thereof. The bolts 19 and 21 carry winged nuts 22, for convenience in handling.

Adapted to be replaceably clamped between the bars 17 and 18 for flexibly overlapping the blade 14 at one edge portion is a strip-like emery cloth or other abrasive sheet of material 23, over which sweeps and contacts the blades 13 of the cutter at the grinding face of such cloth or sheet of material 23, so that when the cutter 11 rotates the blades 13 thereof will become sharpened.

Now, by positioning the mower A as shown in Figure 2 of the drawings with the device applied, the wheels 12 elevated from a foundation or the ground, the latter can be hand turned for the driving of the cutter 11, so that the blades 13 can be automatically sharpened by the said device. In Figure 7 of the drawings, the wheels 12 of the lawn mower are in contact with the foundation or ground, so that when the mower is pulled upon the wheels 12 will drive the cutter 11 and in this fashion the blades 13 thereof will be automatically sharpened by the device when applied to such mower. The flexibility of the cloth or sheet of material 23 will permit the rotary cutter to effectively grind for meeting and conforming with the cutting edge of the lower stationary blade 14, especially when the latter has become worn unevenly, for satisfactory co-operating cutting action between the blades 13 and 14 of the lawn mower.

The bars 17 and 18 may be made of any selected or suitable material for effecting proper clamping action therebetween and durability.

It is, of course, understood that changes, variations and modifications may be made in the invention as fall properly within the scope of the appended claims, without departing from the spirit of the said invention or sacrificing any of its advantages.

It is believed that a clear understanding of the invention as to its construction and operation will be had from the foregoing description when taken in connection with the drawings, so a more extended explanation has been omitted for the sake of brevity.

All foregoing description is used to describe the device in operation on a hand manipulated type of mower for sake of simplicity of understanding, but is not intended to mean that it can not be used on any other type of lawn mower or shearing device.

What is claimed is:

1. A sharpening attachment for a lawn mower having a stationary cutting blade and rotary cutting blades coacting therewith, comprising a pair of adjustably connected clamping bars, means for detachably fastening one bar underslung to the stationary blade so that the upper forward edge of said bar is flush with the front edge of said stationary blade, and the other clamping bar connected to said first clamping bar so that the upper edge of said bar lies in the same horizontal plane as the upper end of said first clamping bar, a flexing abrasive strip clamped by said bars and overlapping the cutting edge of the stationary blade for sweeping engagement by the rotary cutting blades.

2. A sharpening attachment for a lawn mower having a stationary cutting blade and rotary cutting blades coacting therewith, a bar removably connected to the lower face of the stationary cutting blade so that the upper forward edge of said bar is flush with the front edge of said stationary cutting blade, and a flexing abrasive strip carried by the bar and extending over the cutting edge of the stationary blade.

3. A sharpening attachment for a lawn mower having a stationary cutting blade and rotary cutting blades coacting therewith, a bar removably connected to the lower face of the stationary cutting blade, a clamping bar removably secured to the forward face of the first mentioned bar, and a flexible abrasive strip clamped between said bars and extending upwardly and rearwardly over the cutting edge of the stationary blade.

GEORGE J. LAUER.